(12) United States Patent
Chia et al.

(10) Patent No.: US 10,146,989 B2
(45) Date of Patent: Dec. 4, 2018

(54) METHODS FOR CONTROLLING A HAND-HELD ELECTRONIC DEVICE AND HAND-HELD ELECTRONIC DEVICE UTILIZING THE SAME

(71) Applicant: HTC Corporation, Taoyuan, Taoyuan County (TW)

(72) Inventors: Chia-Jun Chia, Taoyuan (TW); Tsung-Pao Kuan, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 626 days.

(21) Appl. No.: 14/276,357

(22) Filed: May 13, 2014

(65) Prior Publication Data
US 2015/0070301 A1    Mar. 12, 2015

Related U.S. Application Data

(60) Provisional application No. 61/875,480, filed on Sep. 9, 2013.

(51) Int. Cl.
| | |
|---|---|
| *G06K 9/00* | (2006.01) |
| *G06F 21/32* | (2013.01) |
| *G06K 9/22* | (2006.01) |
| *G06F 1/16* | (2006.01) |

(52) U.S. Cl.
CPC ....... *G06K 9/00087* (2013.01); *G06F 1/1684* (2013.01); *G06F 21/32* (2013.01); *G06K 9/0002* (2013.01); *G06K 9/228* (2013.01); *G06F 2221/2105* (2013.01)

(58) Field of Classification Search
CPC .. G06K 9/00087; G06K 9/0002; G06K 9/228; G06F 1/1684; G06F 21/32; G06F 2221/2105

See application file for complete search history.

(56) References Cited

U.S. PATENT DOCUMENTS

| | | | |
|---|---|---|---|
| 6,317,508 B1 | 11/2001 | Kramer et al. | |
| 7,289,649 B1 | 10/2007 | Walley et al. | |
| 8,224,044 B2 | 7/2012 | Benkley, III | |
| 8,315,444 B2 | 11/2012 | Gardner | |
| 2004/0081339 A1 | 4/2004 | Benkley, III | |
| 2004/0204202 A1* | 10/2004 | Shimamura | H04M 1/0235 455/575.1 |
| 2005/0031175 A1* | 2/2005 | Hara | G06K 9/0002 382/124 |

(Continued)

FOREIGN PATENT DOCUMENTS

| | | |
|---|---|---|
| CN | 101809581 A | 8/2010 |
| CN | 101853379 A | 10/2010 |

(Continued)

*Primary Examiner* — Sejoon Ahn
(74) *Attorney, Agent, or Firm* — Birch, Stewart, Kolasch & Birch, LLP

(57) ABSTRACT

A hand-held electronic device hand-held electronic device. A sensing surface is adopted to detect fingerprints and a contact of an object on the sensing surface. Storage stores a fingerprint signature. A controller is configured to determine whether a composition of detected fingerprints matches with the fingerprint signature and determine at least one character of the contact. The at least one character comprises a location on which the object contacts the sensing surface.

22 Claims, 16 Drawing Sheets

(56) References Cited

U.S. PATENT DOCUMENTS

| | | | |
|---|---|---|---|
| 2006/0034499 A1* | 2/2006 | Shinoda | G06K 9/00013 382/124 |
| 2007/0262968 A1* | 11/2007 | Ohshita | G06F 3/0213 345/173 |
| 2009/0058598 A1* | 3/2009 | Sanchez Sanchez | G06F 21/32 340/5.83 |
| 2009/0083847 A1 | 3/2009 | Fadell et al. | |
| 2010/0088061 A1* | 4/2010 | Horodezky | G06F 1/1624 702/141 |
| 2010/0220900 A1 | 9/2010 | Orsley | |
| 2010/0225607 A1* | 9/2010 | Kim | G06F 3/042 345/173 |
| 2011/0013813 A1* | 1/2011 | Yamamoto | G06K 9/00026 382/124 |
| 2011/0193727 A1* | 8/2011 | Goto | G06F 3/03547 341/20 |
| 2011/0267298 A1* | 11/2011 | Erhart | G06F 1/1626 345/173 |
| 2011/0316799 A1 | 12/2011 | Lee et al. | |
| 2012/0086651 A1* | 4/2012 | Kwon | G06F 3/016 345/173 |
| 2012/0092293 A1* | 4/2012 | Ganapathi | G02B 26/0833 345/174 |
| 2012/0105081 A1* | 5/2012 | Shaikh | G06K 9/0002 324/686 |
| 2012/0272230 A1* | 10/2012 | Lee | G06F 1/329 717/173 |
| 2013/0076485 A1* | 3/2013 | Mullins | G06F 21/32 340/5.83 |
| 2013/0181949 A1* | 7/2013 | Setlak | G06K 9/0002 345/175 |
| 2013/0271161 A1* | 10/2013 | Solven | G06F 3/041 324/661 |
| 2014/0028579 A1* | 1/2014 | Taby | G06F 3/0488 345/173 |
| 2014/0042398 A1* | 2/2014 | Choi | H01L 27/3244 257/40 |
| 2014/0225821 A1* | 8/2014 | Kim | H04M 1/236 345/156 |
| 2015/0269409 A1* | 9/2015 | Weber | G06F 3/044 382/125 |
| 2015/0278562 A1* | 10/2015 | Adrangi | G06K 7/10237 455/41.1 |
| 2016/0342781 A1* | 11/2016 | Jeon | G06F 21/32 |

FOREIGN PATENT DOCUMENTS

| | | |
|---|---|---|
| EP | 2 230 623 A1 | 9/2010 |
| EP | 2 400 377 A2 | 12/2011 |
| WO | WO 2013/130396 A2 | 9/2013 |

\* cited by examiner

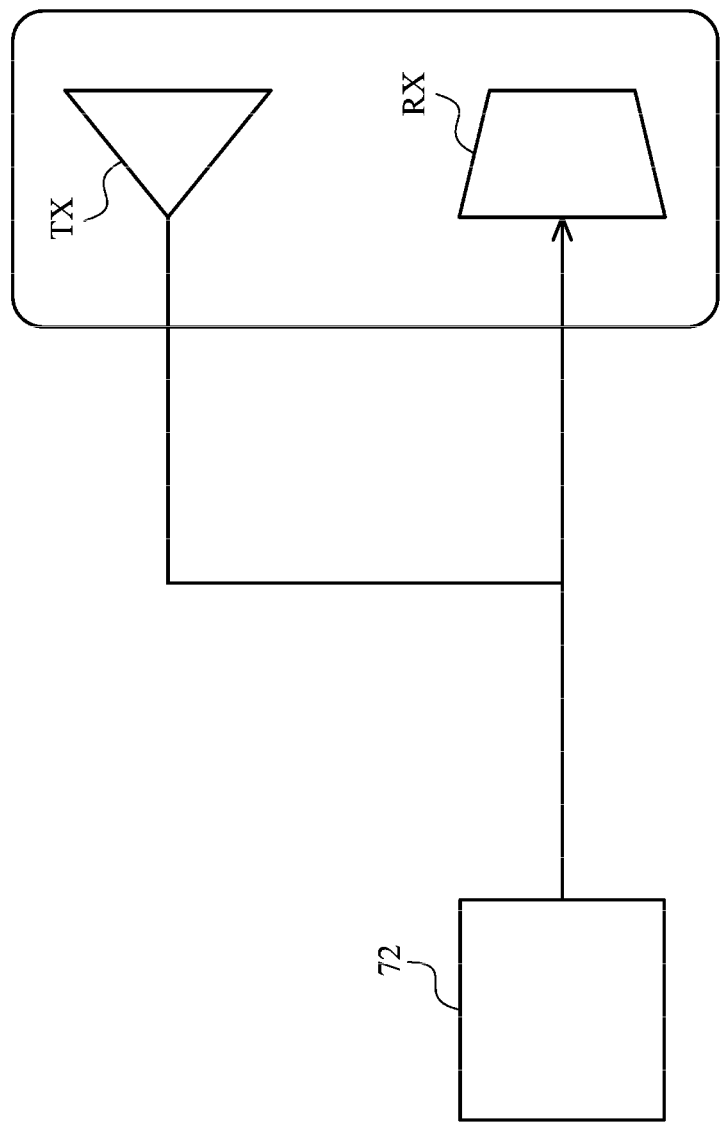

METHODS FOR CONTROLLING A HAND-HELD ELECTRONIC DEVICE AND HAND-HELD ELECTRONIC DEVICE UTILIZING THE SAME

CROSS REFERENCE TO RELATED APPLICATIONS

This application claims the benefit of U.S. Provisional Application No. 61/875,480 filed Sep. 9, 2009. The entire contents of which are hereby incorporated by reference.

BACKGROUND OF THIS APPLICATION

Field of this Application

This application relates to a hand-held electronic device, and more particularly to a hand-held electronic device having enhanced touch control functionality.

Description of the Related Art

As information technology advances, wireless mobile communication and information appliances have been rapidly developed and applied to achieve more convenience, smaller volume, lighter weight and more user-friendly designs. Various information products have changed from using conventional input devices such as keyboards or mouse devices to using touch panels.

Based on different sensing types, touch panels can be categorized into resistive touch panels, capacitive touch panels, optical touch panels, acoustic-wave touch panels and electromagnetic touch panels. In comparison to other touch panels, the capacitive touch panels are characterized by short response speed, favorable reliability, high definition, and so on. Therefore, the capacitive touch panels are widely used in portable electronic products.

In order to further enhance the touch control functionality of a hand-held electronic device, some novel hand-held electronic device designs are proposed.

BRIEF SUMMARY OF THIS APPLICATION

Hand-held electronic device and method for controlling a hand-held electronic device are provided. An exemplary embodiment of a hand-held electronic device comprises a sensing surface, a storage and a controller. The sensing surface is adopted to detect fingerprints and a contact of an object on the sensing surface. The storage stores a fingerprint signature. The controller is configured to determine whether a composition of detected fingerprints matches with the fingerprint signature and determine at least one character of the contact. The at least one character comprises a location on which the object contacts the sensing surface.

An exemplary embodiment of a method for controlling a hand-held electronic device comprises detecting fingerprints and a contact of an object on a sensing surface of the hand-held electronic device; determining whether a composition of detected fingerprints matches with a fingerprint signature; determining at least one character of the contact, wherein the at least one character comprises a location on which the object contacts the sensing surface; and controlling the hand-held electronic device based on whether the composition of detected fingerprints matches with a fingerprint signature and the at least one character of the contact.

A detailed description is given in the following embodiments with reference to the accompanying drawings.

BRIEF DESCRIPTION OF DRAWINGS

This application can be more fully understood by reading the subsequent detailed description and examples with references made to the accompanying drawings, wherein:

FIG. 7A shows an exemplary second sensing unit according to an embodiment of this application;

DETAILED DESCRIPTION OF THIS APPLICATION

The following description is of the best-contemplated mode of carrying out this application. This description is made for the purpose of illustrating the general principles of this application and should not be taken in a limiting sense. The scope of this application is best determined by reference to the appended claims.

Figure 1:
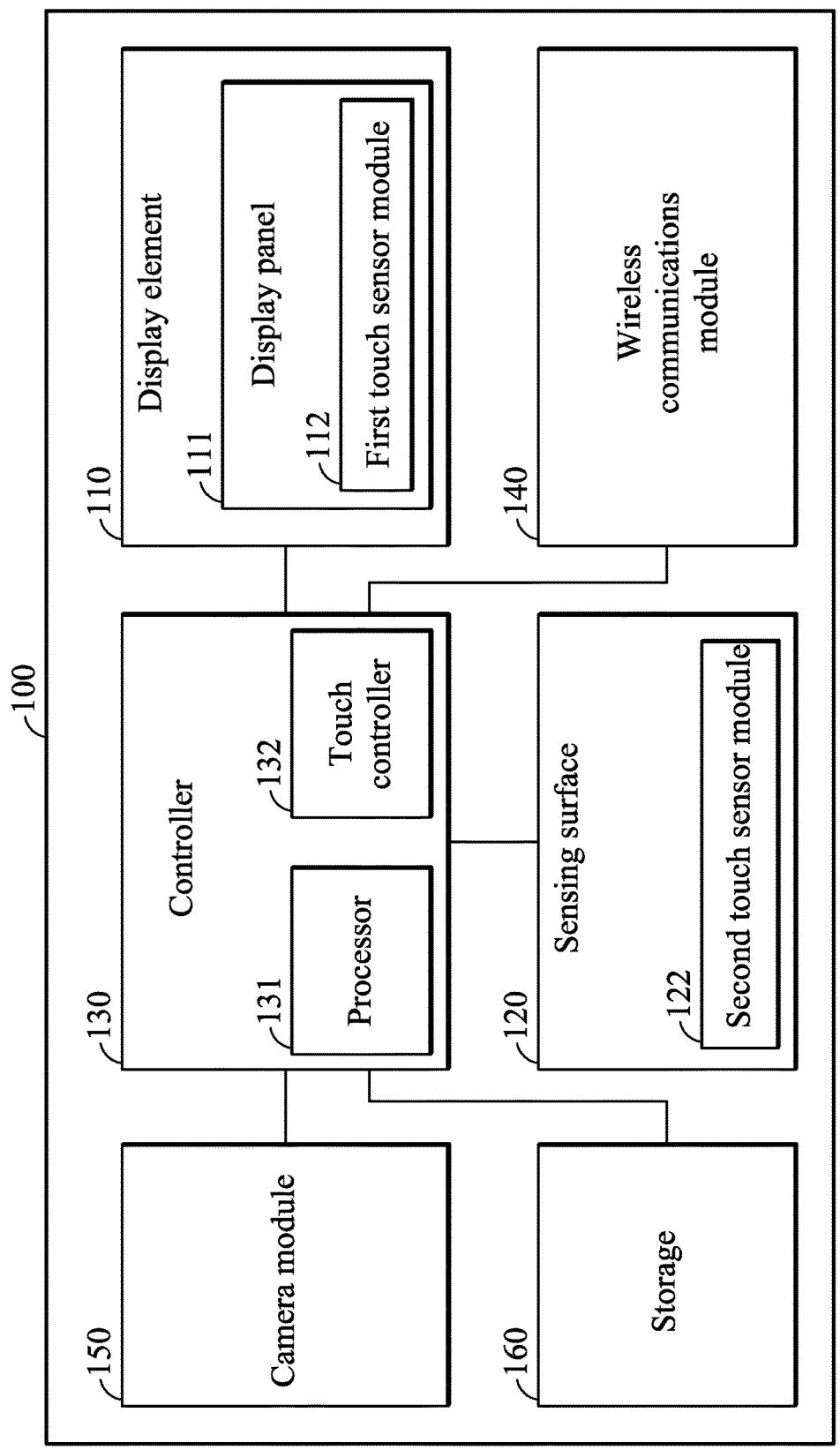
FIG. 1 shows a simplified block diagram of a hand-held electronic device according to an embodiment of this application.

FIG. 1 shows a simplified block diagram of a hand-held electronic device according to an embodiment of this application. The hand-held electronic device 100 may comprise a display element 110, a sensing surface 120, a controller 130, a wireless communications module 140, a camera module 150 and storage 160. Please note that FIG. 1 presents a simplified block diagram, in which only the elements relevant to this application are shown. However, this application should not be limited what is shown in FIG. 1.

The display element 110 is adopted to provide display functionality for the hand-held electronic device 100 and may further provide touch control functionality so as to act as an input device of the hand-held electronic device 100. According to an embodiment of this application, the display element 110 may comprise a display panel 111 for displaying images and a touch sensor module 112 disposed on the display panel 111 for detecting touch events on the touch sensor module 112.

According to an embodiment of this application, the sensing surface 120 is adopted to provide supplementary touch control functionality so as to act as another input device of the hand-held electronic device 100. The sensing surface 120 may at least comprise a touch sensor module 122 and is adopted to detect fingerprints and a contact of an object on the sensing surface 120. Details of the sensing surface 120 are further discussed in the following paragraphs.

The wireless communications module 140 is arranged to provide a wireless communication functionality, and may further comprise a modem (not shown in the figure), a radio transceiver (not shown in the figure), a micro processing unit (not shown in the figure), and other software, firmware and hardware modules as well-known in the art.

The camera module 150 is arranged to provide a photography functionality and may further comprise an optical sensor (not shown in the figure), lens (not shown in the figure), an image processing unit (not shown in the figure), and other software, firmware and hardware modules as well-known in the art.

The controller 130 is coupled to the display element 110, the sensing surface 120, the wireless communications module 140, the camera module 150 and the storage 160 for controlling the operations thereof. The controller 130 may further comprise a processor 131 and a touch controller 132. The processor 131 may be an application processor or a general purpose processor for controlling the overall operations of the hand-held electronic device 100. The touch controller 132 may analyze sensing results of the touch sensor modules 112 and/or 122 to identify any touch event thereon, and/or may further determine gestures, motions or instructions input by the user of the hand-held electronic device 100. The controller 130 receiving information regarding the determined gestures, motions or instructions from the touch controller 132 may further trigger corresponding functions that have been predefined and/or assigned to the gestures, motions or instructions. Note that in some embodiments of this application, the controller 130 may also determine the gestures, motions or instructions input by the user of the hand-held electronic device 100 and trigger corresponding functions that have been predefined and/or assigned to the gestures, motions or instructions, and this application should not be limited thereto.

The storage 160 is adopted to store a corresponding fingerprint signature for each user, and further a database comprising one or more predetermined commands, instructions, motions and/or gestures, which is/are associated with the at least one character of the contact. According to an embodiment of this application, the at least one character may comprise a location on which the object contacts the sensing surface, a movement or double-click of the contact. The controller 130 may further identify the instructions, motions and/or gestures input by the object based on the at least one character of the contact.

According to an embodiment of this application, the touch sensor modules 112 and 122 are spatially separated from each other and function independently. Since the display element 110 and the sensing surface 120 may both be provided as the input devices for receiving the instructions, motions and/or gestures input by an user holding the hand-held electronic device 100, the controller 130 may further control operations of the hand-held electronic device 100 according to the touch events detected or sensed by the touch sensor modules 112 and/or 122.

Figure 2B:
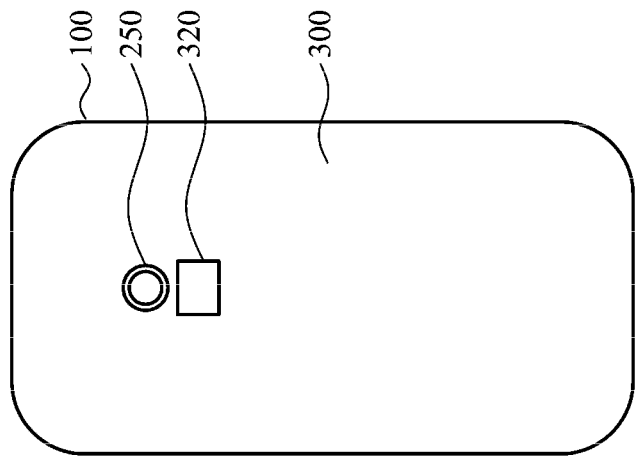
FIG. 2B shows an exemplary appearance of the rear of a hand-held electronic device according to an embodiment of this application.
Figure 2A:
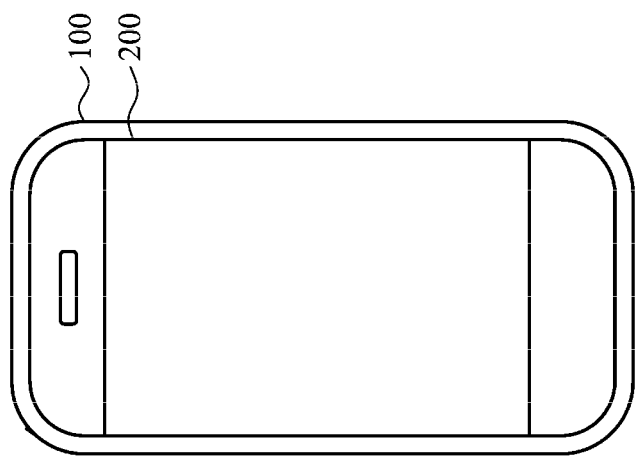
FIG. 2A shows an exemplary appearance of the front of a hand-held electronic device according to an embodiment of this application.
Figure 2C:
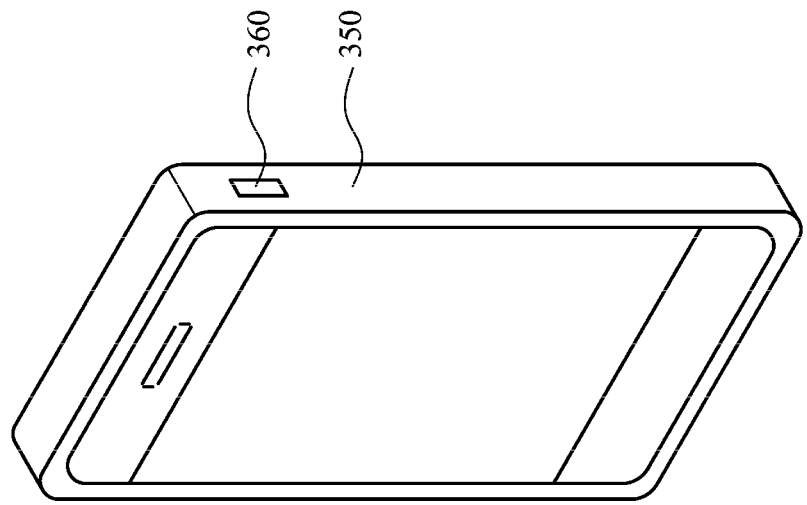
FIG. 2C shows an exemplary appearance of one side of a hand-held electronic device according to an embodiment of this application.

FIG. 2A shows an exemplary appearance of the front of a hand-held electronic device according to an embodiment of this application. FIG. 2B shows an exemplary appearance of the rear of a hand-held electronic device according to an embodiment of this application. FIG. 2C shows an exemplary appearance of one side of a hand-held electronic device according to an embodiment of this application. In the embodiment, the hand-held electronic device 100 is presented as a mobile phone. However, in other embodiments of this application, the hand-held electronic device may also be a tablet computer, a personal digital assistant, a global positioning system, or others, and thus this application should not be limited thereto. According to an embodiment of this application, the touch sensor module 112 may be placed in the front of the hand-held electronic device 100 and the touch sensor module 122 may be placed in the rear of the hand-held electronic device 100. Note that in another embodiment of this application, the touch sensor module 112 and the touch sensor module 122 may both be placed in the front or rear of the hand-held electronic device 100, and this application should not be limited to any specific way of implementation.

The touch sensor module 112 may comprise a plurality of sensing units (not shown in the figure). The sensing units may be disposed on a first surface of the hand-held electronic device 100 (such as the first surface 200 shown in FIG. 2A) and may be capable of sensing touch events. The display element 110 may be coupled to the first surface 200. The sensing surface 320 may be disposed below the camera module 250 and the touch sensor module 122 in the sensing surface 120/320 may comprise a plurality of sensing units (not shown in the figure). The sensing units may be disposed on a second surface of the hand-held electronic device 100 (such as the second surface 300 shown in FIG. 2B) and may be capable of sensing touch events. The sensing surface 320 may be coupled to the second surface 300. According to an embodiment of this application, the second surface 300 is not coplanar with the first surface 200. In addition, the hand-held electronic device 100 may further comprise a third surface 350 having a button 360 coupled thereto. The first surface 200, the second surface 300, and the third surface 350 are not coplanar with each other. Note that in an embodiment of this application, the second surface 300 may be connected to the third surface 350 at a substantially rectangular angle, and a distance between the sensing surface 320 and the button 350 does not exceed twelve centimeter, such that the user can operate the hand-held electronic device 100 by a single hand (for example, one can hold the hand-held electronic device 100 in his palm, touch on the sensing surface 320 while press the button 350 at the same time by using his single hand).

According to an embodiment of this application, the touch sensor module 122 in the sensing surface 120/320 provides enhanced touch control functionality which integrates a fingerprint scan and identification, and an object position and motion detection.

Figure 3:
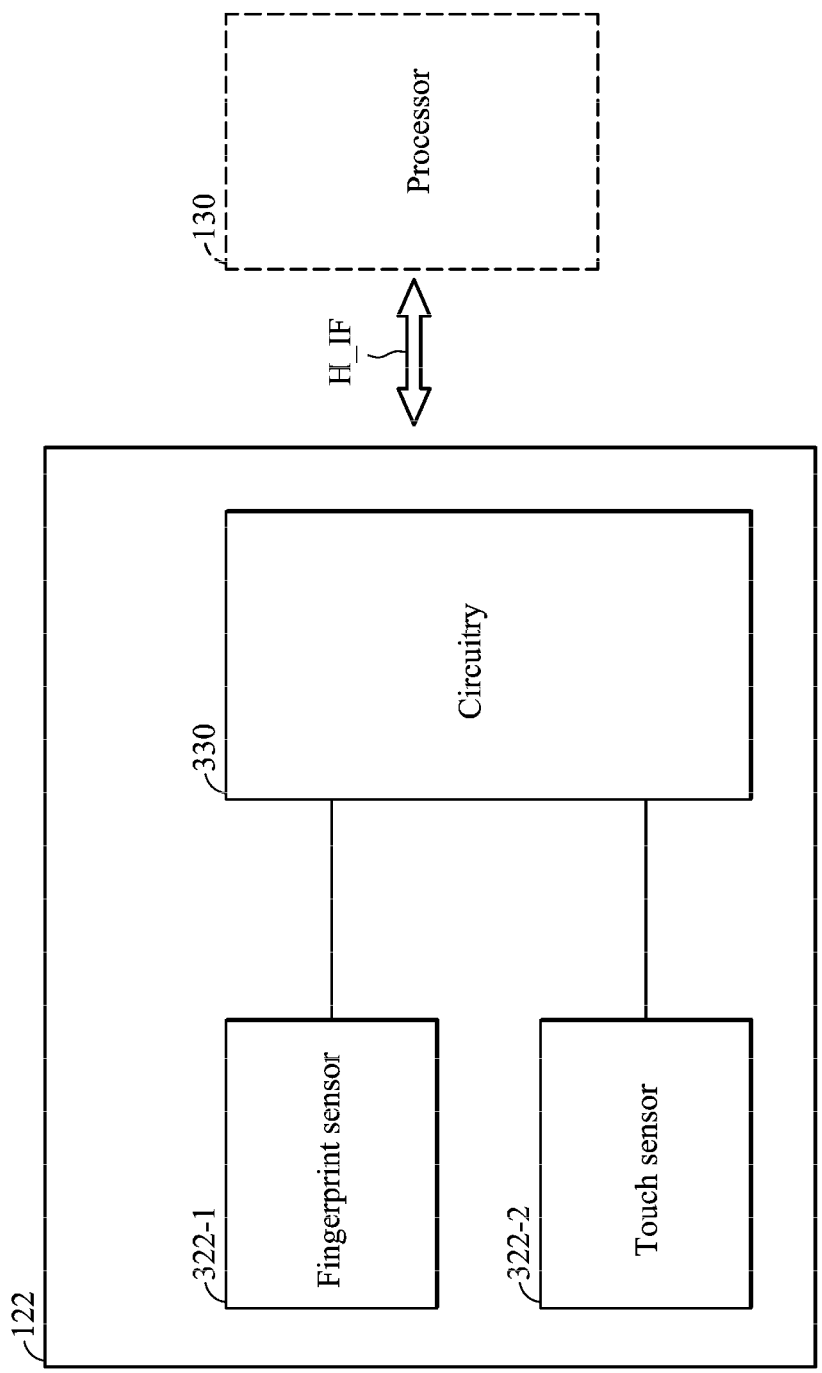
FIG. 3 shows an exemplary block diagram of the touch sensor module in the sensing surface according to an embodiment of this application.

FIG. 3 shows an exemplary block diagram of the touch sensor module in the sensing surface according to an embodiment of this application. The touch sensor module 122 may comprise a fingerprint sensor 322-1 for detecting fingerprints, a touch sensor 322-2 for detecting the at least one character of the contact and a circuitry 330. According to an embodiment of this application, the fingerprint sensor 322-1 and the touch sensor 322-2 are coplanar on the sensing surface. The fingerprint sensor 322-1 may comprise a plurality of first sensing units (not shown in the figure) defining a first touch window capable of sensing touch events. The first sensing unit may be formed by one or more sensing electrodes. Each first sensing unit may correspond to a sensing channel. The circuitry 330 connects the electrodes the fingerprint sensor 322-1 with the touch controller 132 or the controller 130. The touch controller 132 or the controller 130 may scan the first sensing units according to a first scan signal to measure the intensity of electric fields conducted by the ridges and valleys of the fingerprint on the fingerprint sensor 322-1. The touch controller 132 or the controller 130 may further analyze the measured intensity (which may be presented by raw data) to detect any touch event on the fingerprint sensor 322-1 and create a scanned fingerprint image by using the measured intensity of the electric fields when the fingerprint sensor 322-1 is determined to have been touched or pressed. The touch controller 132 or the controller 130 may further compare the scanned fingerprint image with a predetermined fingerprint signature of a user so as to determine whether a composition of detected fingerprints matches with the fingerprint signature (that is, check whether the user's fingerprint is correct).

The touch sensor 322-2 may comprise a plurality of second sensing units (not shown in the figure) defining a second touch window capable of detecting the at least one character of the contact of the object. According to an embodiment of this application, the object may be a finger, a stylus, a pen or the likes. The second sensing unit may be formed by one or more sensing electrodes. Each second sensing unit may correspond to a sensing channel. The circuitry 330 connects the electrodes of the touch sensor 322-2 with the touch controller 132 or the controller 130. The touch controller 132 or the controller 130 may scan the second sensing units according to a second scan signal to measure the intensity of electric fields conducted by the object on the touch sensor 322-2. The touch controller 132 or the controller 130 may further analyze the measured intensity (which may be presented by raw data) to detect any touch event on the touch sensor 322-2, determine the at least one character of the contact of the object and/or may further determine commands, gestures, motions or instructions input by the object. The touch controller 132 or the controller 130 may communicate with the touch sensor module 122 via the host interface H_IF. The touch controller 132 or the controller 130 may further trigger corresponding functions that have been predefined and/or assigned to the commands, gestures, motions or instructions.

According to an embodiment of this application, the fingerprint sensor 322-1 and the touch sensor 322-2 may be packaged in the same die. According to another embodiment of this application, the fingerprint sensor 322-1 and the touch sensor 322-2 may be packaged in different dies.

The touch controller 132 or the controller 130 may further be configured to switch the sensing surface 122 between a fingerprint recognition mode and a touch sensing mode, which will be further discussed in the following paragraphs. The touch sensing mode comprises mutual capacitance sensing.

Figure 4:
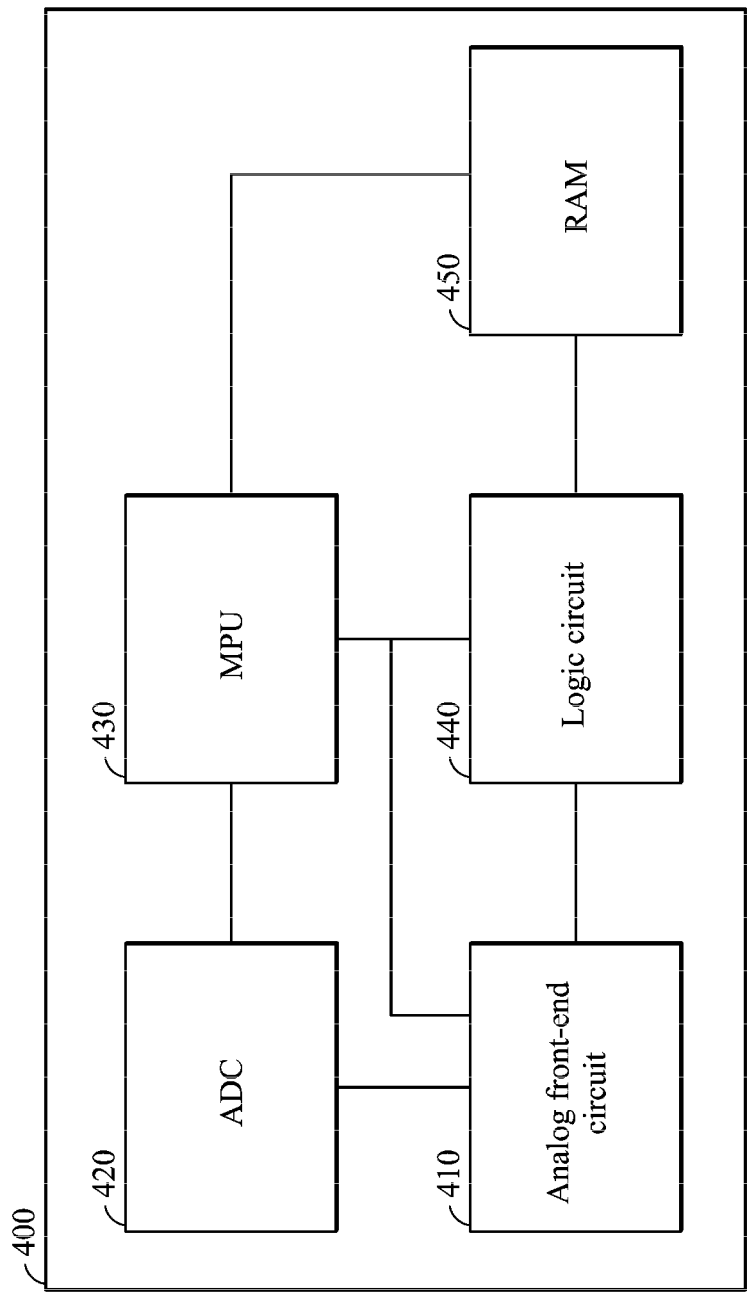
FIG. 4 shows an exemplary block diagram of a touch controller according to an embodiment of this application.

FIG. 4 shows an exemplary block diagram of a touch controller according to an embodiment of this application. The touch controller 400 may comprise an analog front-end circuit 410, an analog to digital converter (ADC) 420, a micro processing unit (MPU) 430, a logic circuit 440 and a random access memory (RAM) 450. The analog front-end circuit 410 is adopted to transmit and receive the scan signal to and from the touch sensor modules. The analog to digital converter 420 is adopted to perform analog to digital conversion on the electronic signals received from the analog front-end circuit 410, wherein the electronic signals are capable of representing the sensing results. The micro processing unit 430 is adopted to control operations of the analog front-end circuit 410 and the analog to digital converter 420, measure the intensity of electric fields conducted by the finger or the object based on the output of the analog to digital converter 420 and detect the touch event based on the measured intensity of the electric fields. The micro processing unit 430 is further adopted to control the scan rate of the scan signal and determine the character of the contact, such as the touch motions and/or gestures input by the finger or the object. The logic circuit 440 is utilized to provide basic logic function to facilitate operations of the touch controller. The RAM 450 is utilized to store the system data of the touch controller.

Figure 5:
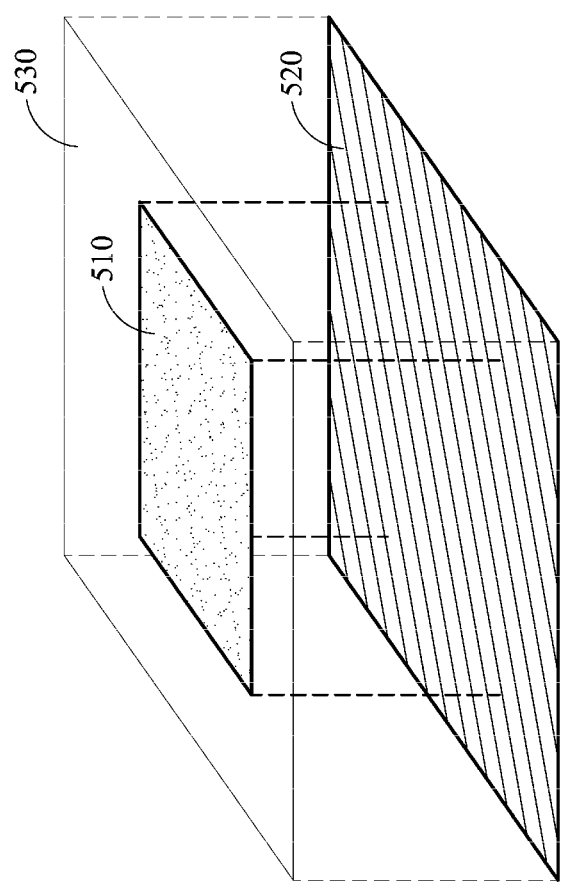
FIG. 5 shows an exemplary cross-sectional view of the first and second touch window of the touch sensor module on the sensing surface according to an embodiment of this application.

FIG. 5 shows an exemplary cross-sectional view of the first and second touch window of the touch sensor module on the sensing surface according to an embodiment of this application. The first touch window 510 is defined by the first sensing units of the fingerprint sensor and the second touch window 520 is defined by the second sensing units of the touch sensor. According to an embodiment of this application, the second touch window 520 having a second sensing area substantially larger than a first sensing area of the first touch window 510. In addition, according to an embodiment of this application, the second touch window 520 may partially overlap with or cover the first touch window 510 and the first touch window 510 may be disposed in the central portion of the second touch window 520 as shown in FIG. 5. Note that in some embodiments of this application, the first touch window 510 may also be disposed in the upper portion of the second touch window 520, in the lower portion of the second touch window 520, in the left portion of the second touch window 520, or in the right portion of the second touch window 520, and this application should not be limited to FIG. 5.

Note further that in a preferred embodiment of this application, the fingerprint sensor is adopted to detect fingerprints at a first pixel density while the touch sensor is adopted to detect the contact at a second pixel density, and the first pixel density is substantially larger than the second pixel density.

Figure 6A:
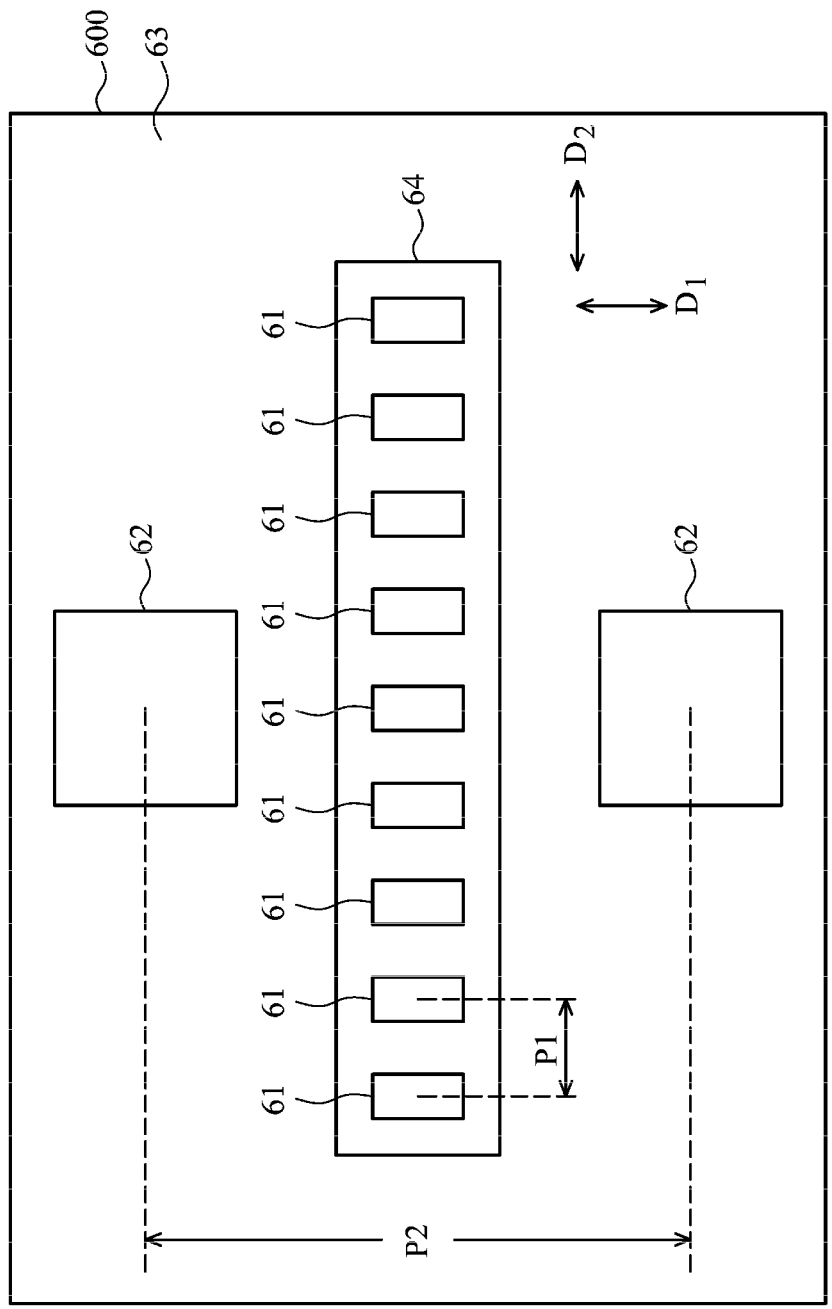
FIG. 6A shows exemplary distributions of the first sensing units and the second sensing units according to a first embodiment of this application.

FIG. 6A shows exemplary distributions of the first sensing units and the second sensing units according to a first embodiment of this application. The touch sensor module 600 may comprise a plurality of first sensing units 61 and a plurality of second sensing units 62 coupled to the substrate 63. As shown in FIG. 6A, the pixel density of the first sensing units 61 is larger than the pixel density of the second sensing units 62, and the second pitch (e.g. P2) of the second sensing units 62 is greater than the first pitch (e.g. P1) of the first sensing units 61. In addition, as shown in FIG. 6A, the first pitches of the first sensing units 61 may have one or more pitches including a maximum pitch and the second pitches of the second sensing units 62 may have one or more pitches including a minimum pitch, and wherein the minimum pitch of the second sensing units 62 is wider than the maximum pitch of the first sensing units 61.

According to an embodiment of this application, the fingerprint sensor may be a swipe type fingerprint sensor having the first sensing unit (or, the first set of electrodes) aligned generally orthogonally to a first direction of motion of a finger, and the first sensing unit (or, the first set of electrodes) may form a predetermined pattern having a width along the first direction and a length along a second direction orthogonal to the first direction. FIG. 6A shows the exemplary predetermined pattern 64, the exemplary first direction D1 and the exemplary second direction D2 of an embodiment of this application. In addition, the second sensing unit (or, the second set of electrodes) may comprise one or more copper pads arranged around the fingerprint sensor, and the minimum pitch of the one or more copper pads may be substantially larger than the width of the predetermined pattern formed by the first sensing unit.

According to an embodiment of this application the second sensing unit (or, the second set of electrodes) are distributed around the first sensing unit (or, the first set of electrodes), and the first sensing unit (or, the first set of electrodes) and the second sensing unit (or, the second set of electrodes) are coplanar on the sensing surface. Note that, here, the layout pattern and the number of first sensing units 61 and the second sensing units 62 as shown in FIG. 6A are merely an example to illustrate the concept of this application, and this application should not be limited thereto. Note further that according to an embodiment of this application, besides the fingerprint sensor, the touch sensor, the circuitry and the substrate, the sensing surface may further comprise a protective cap, such as the protective cap 530 shown in FIG. 5, mounted on the substrate 63 and covering the first set of electrodes (which defining the first touch window 510) and the second set of electrodes (which defining the second touch window 520) as shown in FIG. 5.

Figure 6B:
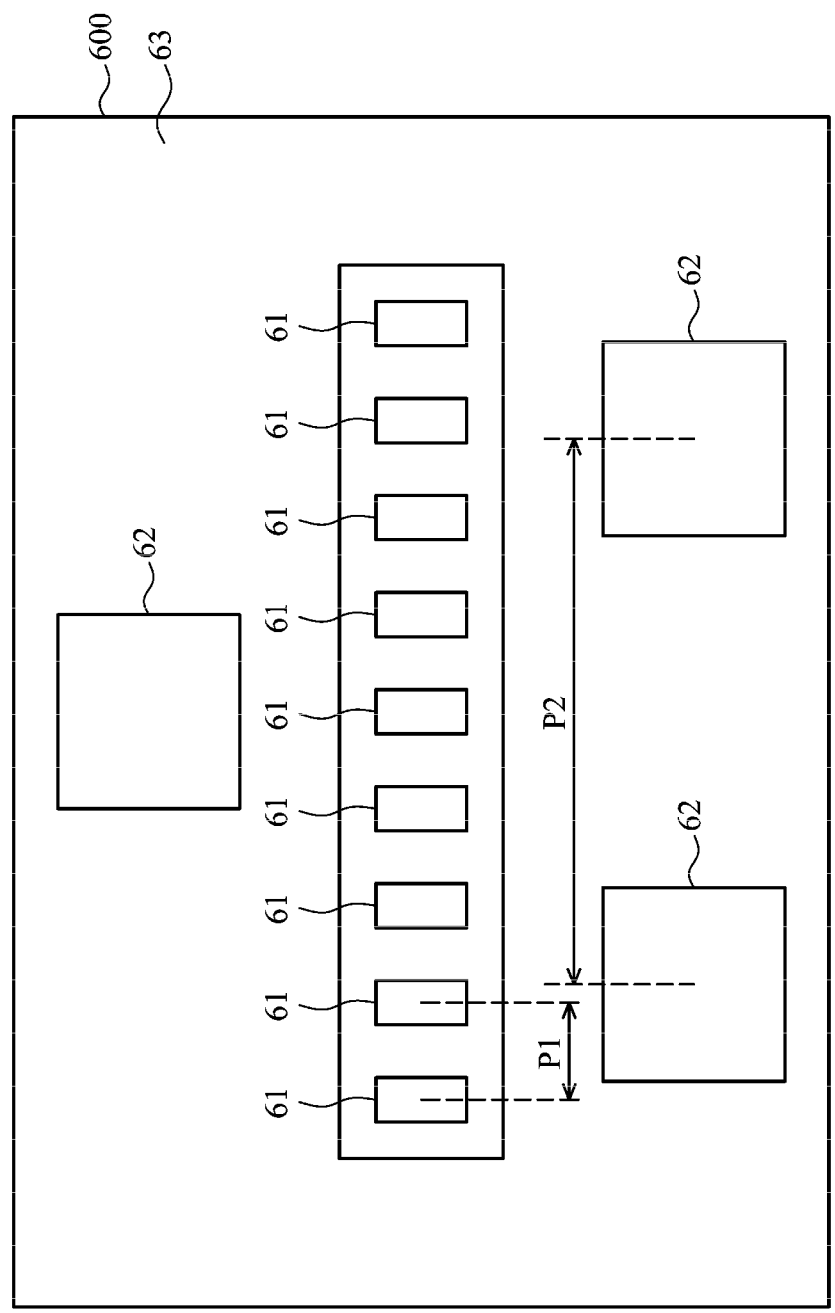
FIG. 6B shows exemplary distributions of the first sensing units and the second sensing units according to a second embodiment of this application.

FIG. 6B shows exemplary distributions of the first sensing units and the second sensing units according to a second embodiment of this application. As shown in FIG. 6B, the pixel density of the first sensing units 61 is larger than the pixel density of the second sensing units 62, and the second pitch (e.g. P2) of the second sensing units 62 is greater than the first pitch (e.g. P1) of the first sensing units 61. In addition, as shown in FIG. 6B, the first pitches of the first sensing units 61 may have one or more pitches including a maximum pitch and the second pitches of the second sensing units 62 may have one or more pitches including a minimum pitch, and wherein the minimum pitch is wider than the maximum pitch. Note that, here, the layout pattern and the number of first sensing units 61 and the second sensing units 62 as shown in FIG. 6B are merely an example to illustrate the concept of this application, and this application should not be limited thereto.

Figure 6C:
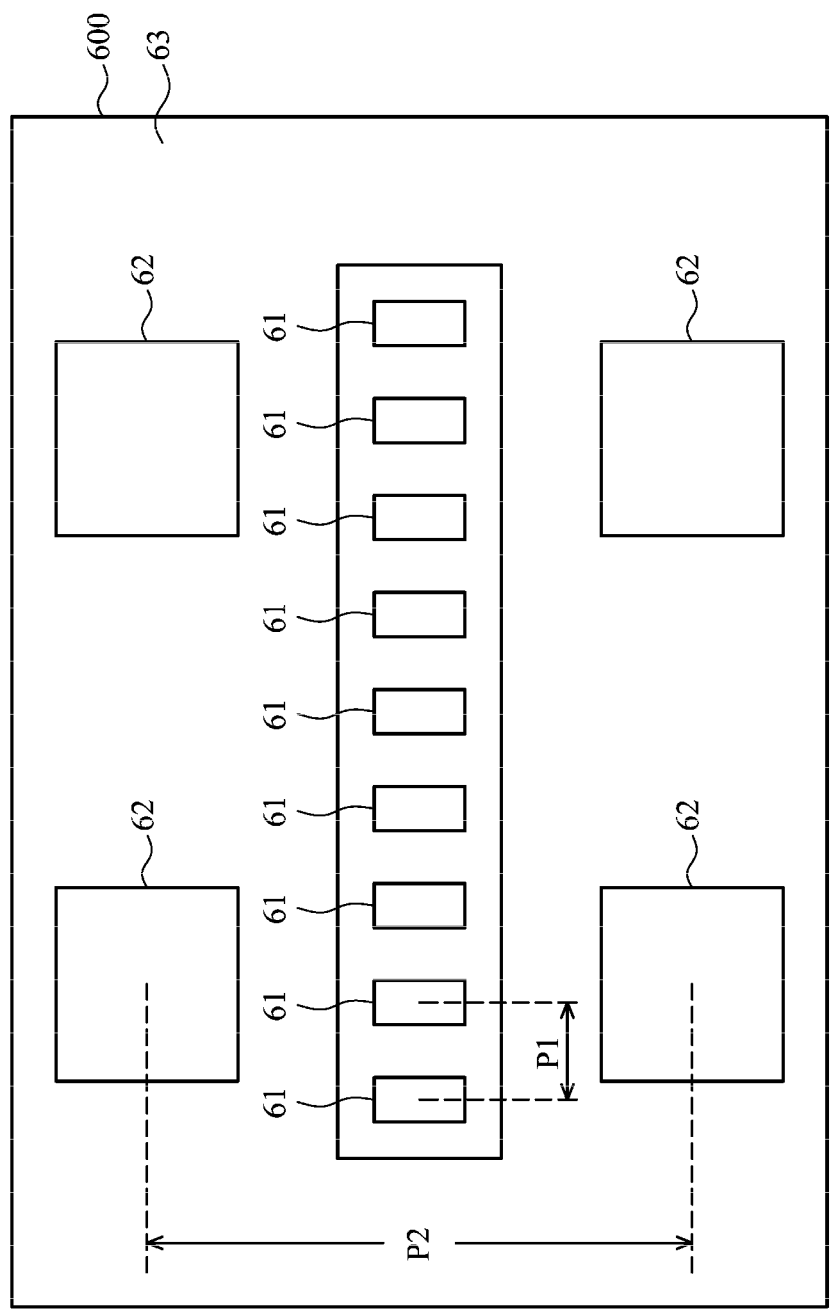
FIG. 6C shows exemplary distributions of the first sensing units and the second sensing units according to a third embodiment of this application.

FIG. 6C shows exemplary distributions of the first sensing units and the second sensing units according to a third embodiment of this application. As shown in FIG. 6C, the pixel density of the first sensing units 61 is larger than the pixel density of the second sensing units 62, and the second pitch (e.g. P2) of the second sensing units 62 is greater than the first pitch (e.g. P1) of the first sensing units 61. In addition, as shown in FIG. 6C, the first pitches of the first sensing units 61 may have one or more pitches including a maximum pitch and the second pitches of the second sensing units 62 may have one or more pitches including a minimum pitch, and wherein the minimum pitch is wider than the maximum pitch. Note that, here, the layout pattern and the number of first sensing units 61 and the second sensing units 62 as shown in FIG. 6C are merely an example to illustrate the concept of this application, and this application should not be limited thereto.

FIG. 7A shows an exemplary second sensing unit according to an embodiment of this application. In the embodiment, the second sensing unit 72 is a copper pad and is coupled to a transmitting circuit TX and a receiving circuit RX of the analog front end circuit of the touch controller.

Figure 7B:
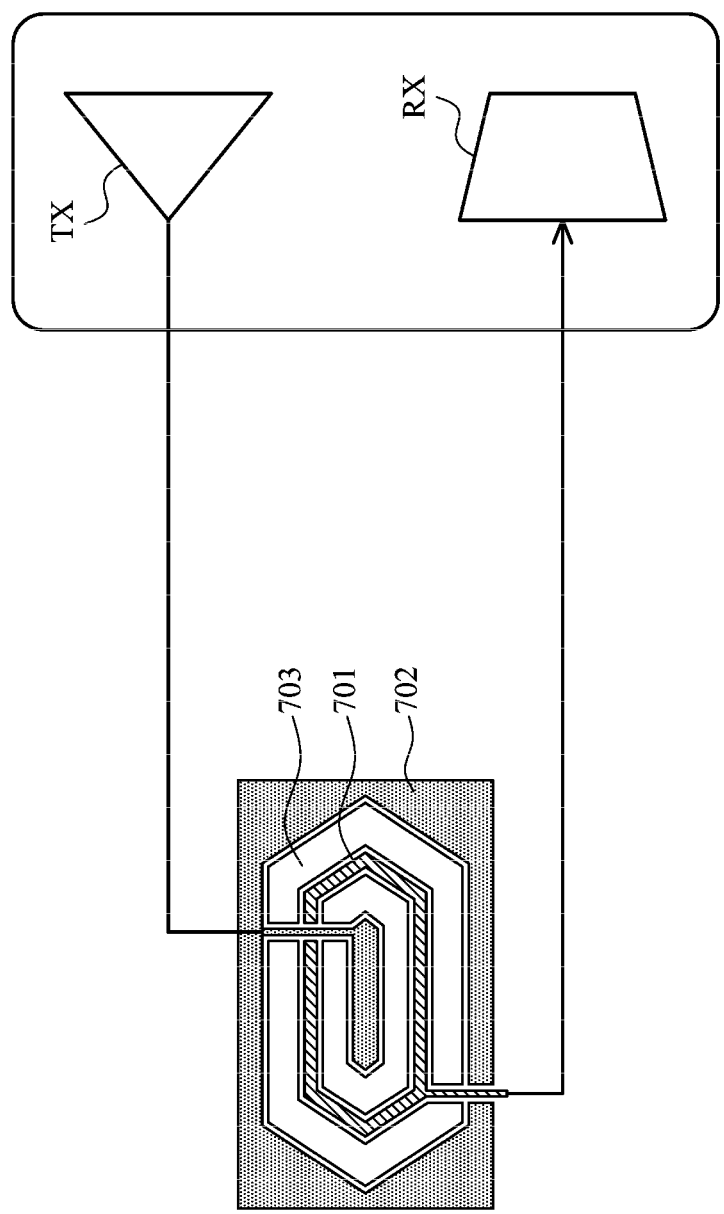
FIG. 7B shows another exemplary second sensing unit according to another embodiment of this application.

FIG. 7B shows another exemplary second sensing unit according to another embodiment of this application. According to another embodiment of this application, the second sensing unit may be a single layer sensor comprising a transmitter electrode 701, a receiver electrode 702 and a gap pattern 703 between the transmitter electrode 701 and the receiver electrode 702. Details of the single layer sensor may refer to U.S. application Ser. No. 13/736,881, filed on 8 Jan. 2013 and entitled "Touch Panel", which is incorporated herein by reference.

According to an embodiment of this application, taking the exemplary distributions in FIG. 6C as an example, although the second sensing units (or, the second sensing electrodes) are rarer than the first sensing units (or, the first sensing electrodes), the second sensing units are still capable of sensing all the touch events on the touch sensor, including the touch events that occur in the central position of the second touch window, or that occur on the first sensing units where there are no second sensing units distributed. Several algorithms for determining the centroid of a contact of an object that touches or presses on the second touch window defined by the second sensing units will be further introduced in the following paragraphs.

Figure 8:
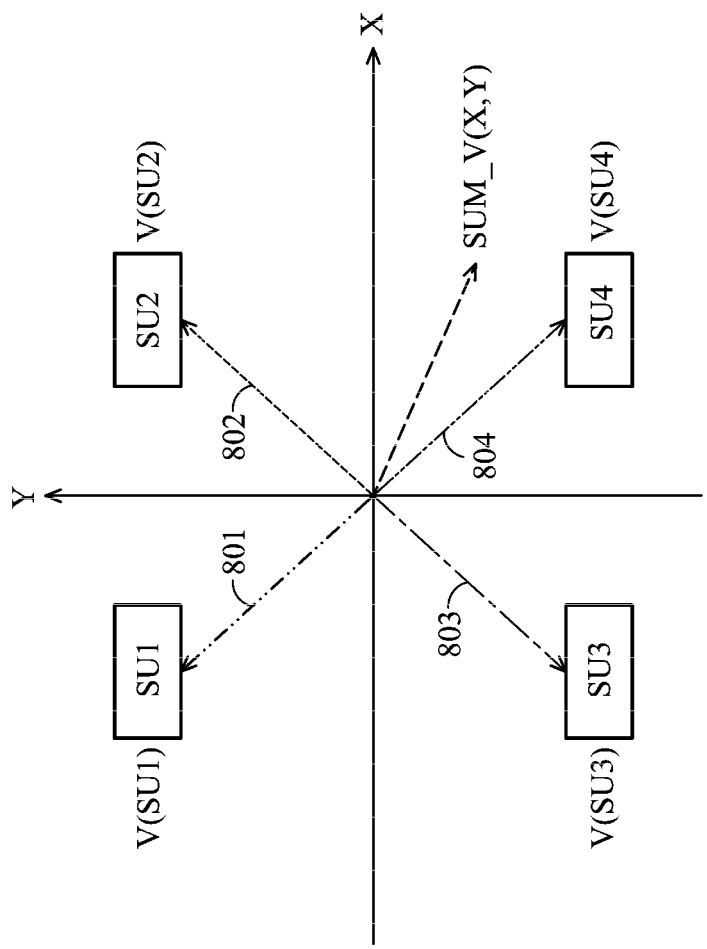
FIG. 8 shows an exemplary second touch window according to an embodiment of this application.

FIG. 8 shows an exemplary second touch window according to an embodiment of this application. Suppose that there are four second sensing units SU1, SU2, SU3 and SU4 defining the second touch window, and V(SU1), V(SU2), V(SU3) and V(SU4) respectively representing the sensing results sensed by the second sensing units SU1, SU2, SU3 and SU4. The sensing results may be the raw data of the measured intensity of the electric fields or sensed capacitance. The intensity or capacitance conducted by the object at the four second sensing units may respectively contribute four vectors 801, 802, 803 and 804, and the coordinate of a summation of the vectors SUM_V(X,Y) may be obtained by:

$$X = V(SU2)*\cos(\pi/4) + V(SU1)*\cos(3\pi/4) + V(SU3)*\cos(5\pi/4) + V(SU4)*\cos(7\pi/4) \quad \text{Eq. (1)}$$

$$Y = V(SU2)*\sin(\pi/4) + V(SU1)*\sin(3\pi/4) + V(SU3)*\sin(5\pi/4) + V(SU4)*\sin(7\pi/4) \quad \text{Eq. (2)}$$

Once the coordinate of the summation of the vector are derived, the location (X,Y) of the centroid of the object is obtained. In addition, the motion of the object may further be determined according to the location of the centroid of the object determined over a period of time. Note that in other embodiments of this application, the number of first sensing units may be less than or more than four, and this application should not be limited thereto.

Figure 9:
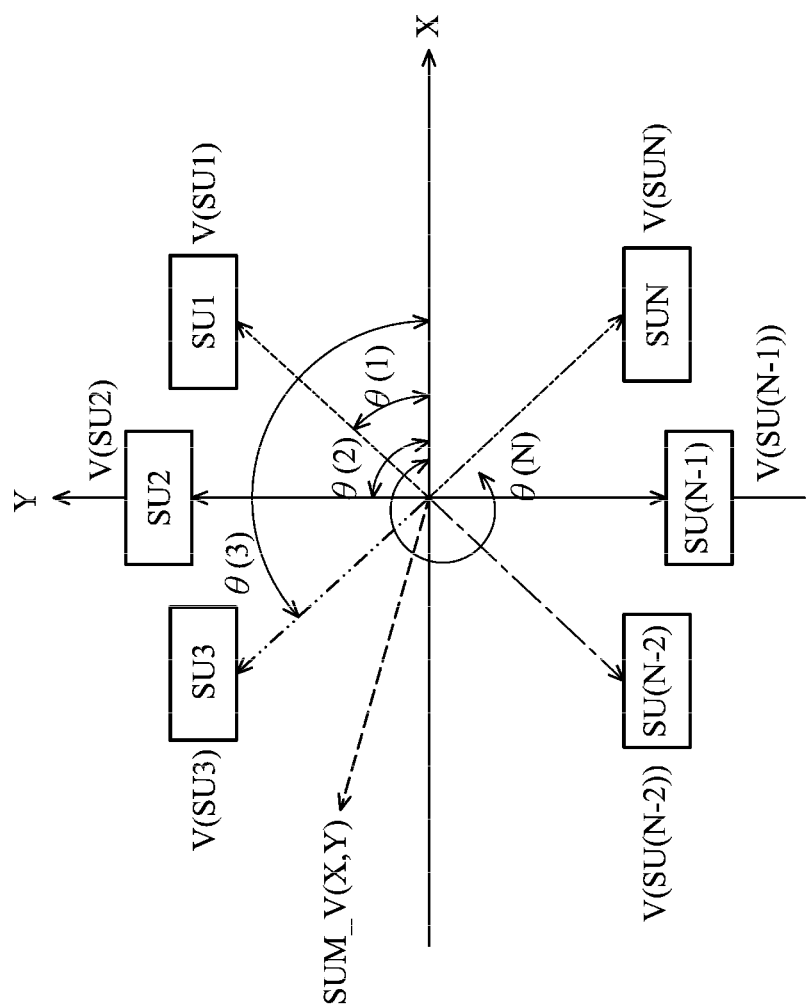
FIG. 9 shows another exemplary second touch window according to another embodiment of this application.

FIG. 9 shows another exemplary second touch window according to another embodiment of this application. When there are N second sensing units SU1~SUN defining the second touch window, and V(SU1), V(SU2), V(SU3), . . . V(SU(N−2)), V(SU(N−1)) and V(SUN) respectively represent the sensing results sensed by the second sensing units SU1~SUN, the coordinates of a summation of the vectors SUM_V(X,Y) may be obtained by:

$$X=V(SU1)*\cos(\theta(1))+V(SU2)*\cos(\theta(2))+V(SU3)*\cos(\theta(3))\ldots+V(SU(N-2))*\cos(\theta(N-2))+V(SU(N-1))*\cos(\theta(N-1))+V(SUN)*\cos(\theta(N)) \quad \text{Eq. (3)}$$

$$Y=V(SU1)*\sin(\theta(1))+V(SU2)*\sin(\theta(2))+V(SU3)*\sin(\theta(3))\ldots+V(SU(N-2))*\sin(\theta(N-2))+V(SU(N-1))*\sin(\theta(N-1))+V(SUN)*\sin(\theta(N)) \quad \text{Eq. (4)}$$

As illustrated in FIG. 8 and FIG. 9, although the second sensing units are rarer than the first sensing units, the second sensing units are still capable of sensing all the touch events on the touch sensor, including the touch events that occur in the central position of the second touch window, or that occur on the first sensing units where there are no second sensing units distributed.

Note that, in the embodiments of this application, the sensitivities of the first and second sensing units are adjustable. Thus, the sensible region of each first/second sensing unit may cover not only the region of first/second sensing unit itself, but also the region around the first/second sensing unit. In addition, note that the origin of the coordinates is not limited to being located at the center of the first/second touch window. For example, the origin of the coordinates can also be located at any corner of the first/second touch window, and this application should not be limited thereto.

Figure 10:
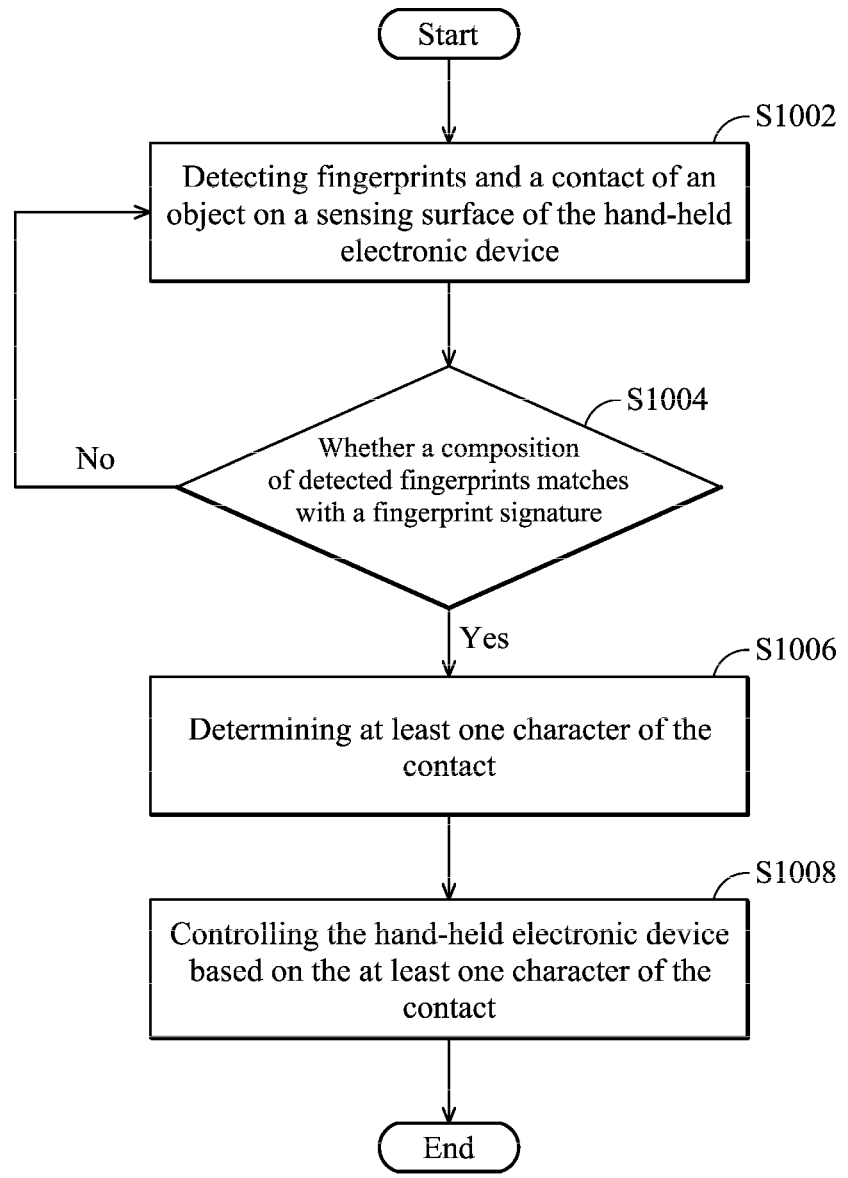
FIG. 10 shows a flow chart of a method for controlling a hand-held electronic device according to an embodiment of this application.

FIG. 10 shows a flow chart of a method for controlling a hand-held electronic device according to an embodiment of this application. First, fingerprints and a contact of an object on a sensing surface of the hand-held electronic device are detected (Step S1002). Next, whether a composition of detected fingerprints matches with a fingerprint signature is determined (Step S1004). If not, the process goes back to step S1002. If so, at least one character of the contact is determined (Step S1006). According to an embodiment of this application, the at least one character may comprise a location on which the object contacts the sensing surface, a movement or double-click of the contact. Next, the controller controls the hand-held electronic device based on the at least one character of the contact (Step S1008).

According to an embodiment of this application, the processor 130 may be further adopted to display on the display element 110 a first information responsive to a positive match between the detected fingerprints and the fingerprint signature, and display on the display element a second information responsive to the at least one character of the contact. The first information is different from the second information. For example, the first information may be an un-locked screen, and the second information may be the screen corresponds to the movement of the contact of the object. In addition, the processor 130 may be further adopted to turn off the display element 110 when the screen is locked. For example, when the button 360 is pressed, the screen is locked. After turning off the display element 110, the processor 130 may be further adopted to turn on the display element 110 when the button 360 is pressed again and display on the display element 110 a locked screen. After displaying on the display element 110 the locked screen, the processor 130 may be further adopted to display on the display element the unlocked screen responsive to the at least one predetermined command or the positive match between the detected fingerprints and the fingerprint signature as discussed above.

As previously described, the sensing surface is adopted to provide supplementary touch-control functionality so as to act as another input device of the hand-held electronic device 100. In addition, the sensing surface may further provide enhanced touch-control functionality which integrates a fingerprint scan and identification with object contact detection. When performing the object contact detection, a virtual joystick or virtual direction keys (for example, the up, down, left and right keys) of the hand-held electronic device 100 that is controlled by the touch events on the sensing surface may be implemented. Several embodiments of the enhanced touch-control functionality provided by the sensing surface are further illustrated in the following paragraphs.

Figure 11:
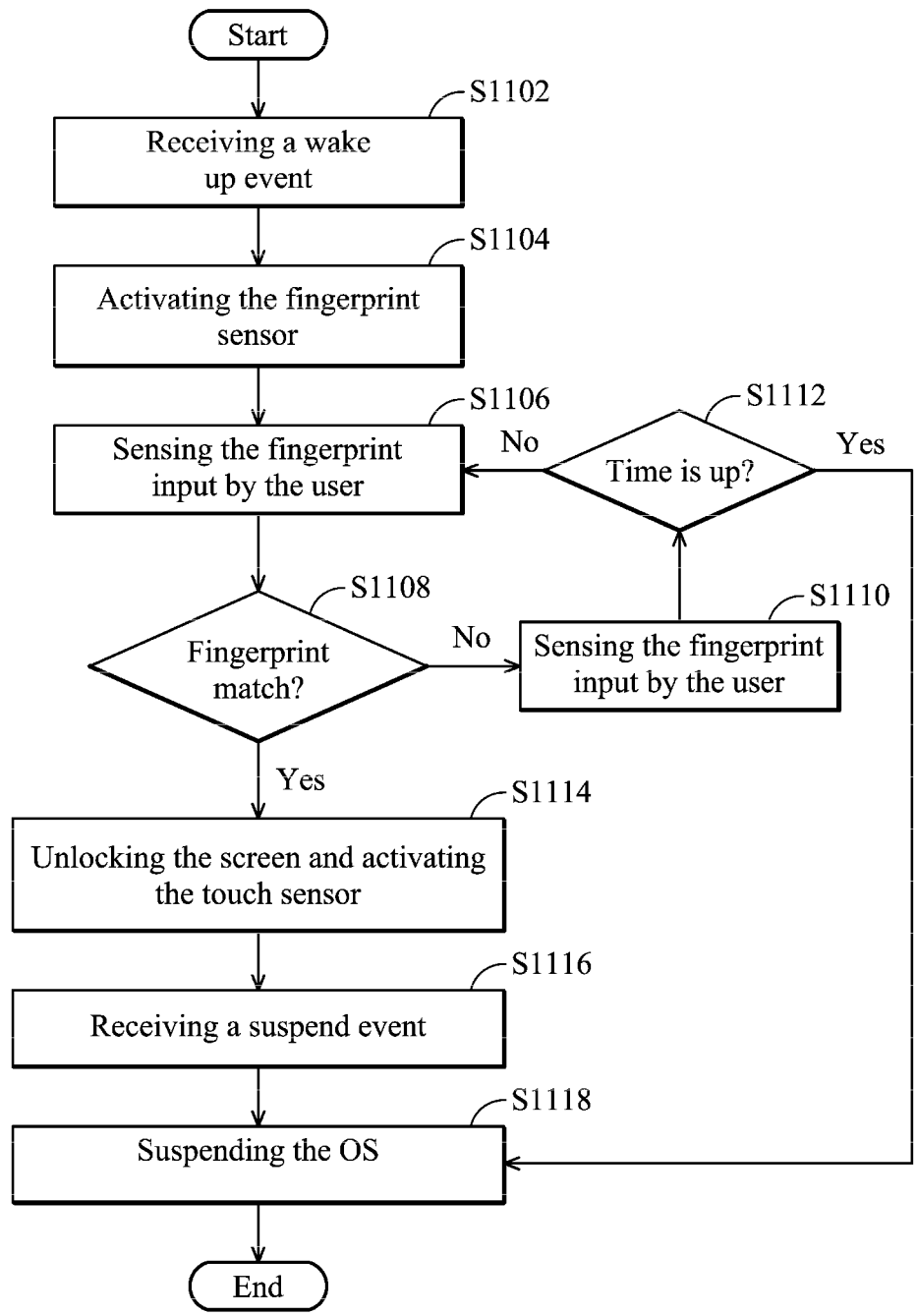
FIG. 11 shows a flow chart of a method for controlling the hand-held electronic device by using supplementary touch control functionality according to an embodiment of this application.

FIG. 11 shows a flow chart of a method for controlling the hand-held electronic device by using supplementary touch control functionality according to an embodiment of this application. Suppose that the operating system (OS) of the hand-held electronic device is now suspended for power saving. The process may begin when receiving a wake up event (Step S1102) to resume the OS. According to an embodiment of this application, the wake up event may be sent when a power key (such as the button 360) is pressed. Next, the fingerprint sensor is activated (Step S1104). Next, the fingerprint sensor starts sensing the fingerprint input by the user (Step S1106). Next, the controller 130 determines whether a composition of the detected fingerprint matches with the fingerprint signature of a user (that is, it checks whether the user's fingerprint is correct) (Step S1108). If not, the fingerprint sensor keeps sensing the fingerprint input by the user (Step S1110) before the time is up (Step S1112). In this embodiment, the user inputs his fingerprint to unlock the screen. If the user's fingerprint is correct, the processor unlocks the screen and activates the touch sensor to further detect gestures, motions, commands and/or instructions input by the user (Step S1114). In an embodiment of this application, the process may stay in step S1114 until receiving a suspend event (Step S1116). In Step S1114, the user may operate the hand-held electronic device by touching the touch window of the sensing surface. As previously described, the user may operate the hand-held electronic device in a similar manner as controlling a virtual joystick or virtual direction keys via the touch window of the sensing surface. Meanwhile, the user may also operate the hand-held electronic device via the touch window on the display element as per a conventional design. In other words, the user may operate the hand-held electronic device via two different touch windows provided by different touch sensor modules at the same time. When the suspend event is received, for example when the power key is pressed or when it is time up to shut down the screen for power saving, the OS is again suspended (Step S1118) and will not resume when until a wake up event is received as in Step S1102.

Figure 12:
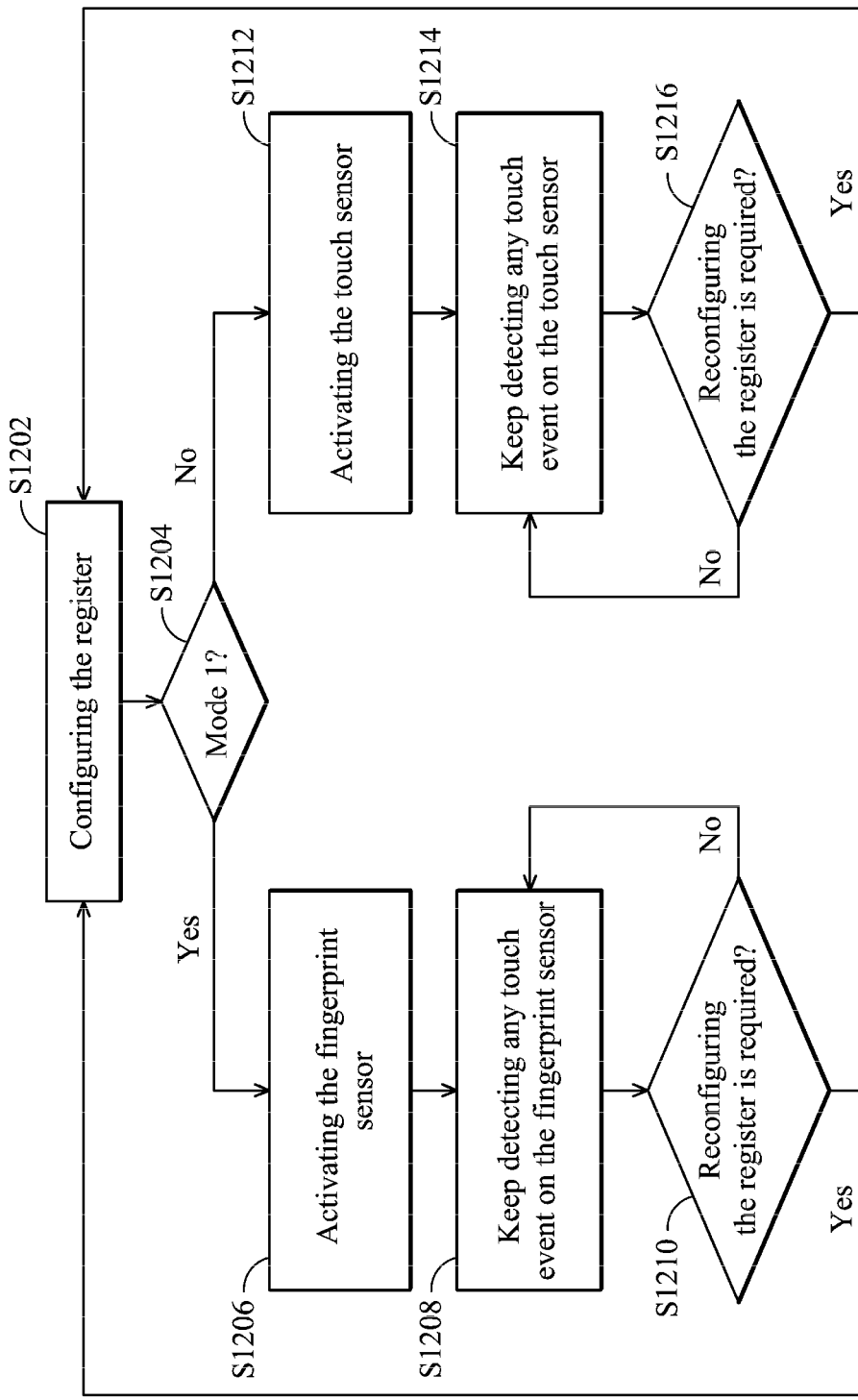
FIG. 12 shows a flow chart of a method for controlling the hand-held electronic device by using supplementary touch control functionality according to another embodiment of this application.

FIG. 12 shows a flow chart of a method for controlling the hand-held electronic device by using supplementary touch control functionality according to another embodiment of this application. In the embodiment, a register may be utilized to distinguish between different modes. For example, when an application program is called, the processor may configure the register based on the current touch control requirement (Step S1202). According to an embodiment of this application, when fingerprint identification is required, the register may be configured to mode 1 (such as the fingerprint recognition mode as discussed above) and when fingerprint identification is not required, the register may be configured to mode 2 (such as the touch sensing mode as discussed above). As an example, other than the unlock embodiment as illustrated above, fingerprint identification is also required when the user is browsing a website or performing any operation that requires the fingerprint identification to test the identity of the user.

When the register is configured to mode 1 (Step S1204), the controller 130 may activate the fingerprint sensor (Step S1206). Note that in some embodiments, a full scan cycle of the touch sensor may be completed when the touch sensor was activated, and the touch sensor may be deactivated before activating the fingerprint sensor. When the fingerprint sensor is activated, the sensing channels of the fingerprint sensor are turned on. In addition, the touch controller 132 (or, the controller 130) may provide a first scan signal having a first scan rate to facilitate the sensing operations in the first mode. Thus, the fingerprint sensor is adopted to detect fingerprints at the first scan rate. Next, the touch controller 132 (or, the controller 130) may keep detecting any touch event or contact on the fingerprint sensor (Step S1208). According to an embodiment of this application, the touch controller 132 (or, the controller 130) may detect the touch event or contact on the fingerprint sensor by scanning the first sensing units on the fingerprint sensor according to the first scan signal to measure the intensity of electric fields conducted by the ridges and valleys of the fingerprint, detecting the touch event or contact based on the measured intensity of the electric fields, and creating a scanned fingerprint image by using the measured intensity of the electric fields. In some embodiments, the touch controller 132 (or, the controller 130) may further compare the scanned fingerprint image with a predetermined fingerprint signature of a user so as to identify the user's fingerprint. The touch controller 132 (or, the controller 130) may leave mode 1 when a reconfiguring of the register is required (Step S1210). For example, when the application program is called.

On the other hand, when the register is configured to mode 2, the controller 130 may activate the touch sensor (Step S1212). Note that, in some embodiments, a full scan cycle of the fingerprint sensor may be completed when the fingerprint sensor was activated, and the fingerprint sensor may be deactivated before activating the touch sensor. When touch sensor is activated, the sensing channels of the touch sensor are turned on. In addition, the touch controller 132 (or, the controller 130) may provide a second scan signal having a second scan rate to facilitate the sensing operations in the second mode. Thus, the touch sensor is adopted to detect fingerprints at the second scan rate. Next, the touch controller 132 (or, the controller 130) may keep detecting any touch event on the touch sensor (Step S1214). According to an embodiment of this application, the touch controller 132 (or, the controller 130) may detect the touch event on the touch sensor by scanning the second sensing units according to the second scan signal to measure the intensity of electric fields conducted by a finger and detecting the touch event based on the measured intensity of the electric fields. The controller 130 may leave mode 2 when a reconfiguring of the register is required (Step S1216). For example, as discussed above, when the application program is called.

Note that in an embodiment of this application, the first scan rate of the first scan signal is substantially faster than the second scan rate of the second scan signal. Therefore, the power consumption in the second mode can be lower than that in the first mode, and the battery power can be greatly saved when controlling the hand-held electronic device in the second mode. In addition, the touch controller 132 (or, the controller 130) may directly adjust (for example, increase or decrease) the scan rate of the scan signal utilized for detecting touch events, and this application should not be limited thereto.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. One or more processors can be implemented in numerous ways, such as with dedicated hardware, or with general purpose hardware that is programmed using microcode or software to perform the functions recited above.

Use of ordinal terms such as "first", "second", etc., in the claims to modify a claim element does not by itself connote any priority, precedence, or order of one claim element over another or the temporal order in which acts of a method are performed, but is used merely as labels to distinguish one claim element having a certain name from another element having the same name (but for use of the ordinal term) to distinguish the claim elements.

While this application has been described by way of example and in terms of preferred embodiment, it is to be understood that this application is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A hand-held electronic device, comprising:
   a display element, comprising a first touch sensor module disposed on a display panel for detecting touch events on the touch sensor module;
   a sensing surface configured to detect fingerprints and a contact of an object on the sensing surface, wherein the sensing surface comprises a second touch sensor module, the second touch sensor module comprises a fingerprint sensor for detecting the fingerprints and a touch sensor for detecting at least one character of the contact;
   a physical storage, configured to store a fingerprint signature; and
   a controller, configured to:
      determine whether a composition of detected fingerprints matches with the fingerprint signature;
      determine at least one character of the contact, wherein the at least one character comprises a location on which the object contacts the sensing surface,
   wherein the first touch sensor module and the second touch sensor module are respectively disposed on opposite surfaces of the hand-held electronic device, and are spatially separated from each other and function independently,
   wherein the controller is further configured to switch the sensing surface between a fingerprint recognition mode to detect fingerprints through the fingerprint sensor and a touch sensing mode to detect the at least one character of the contact through the touch sensor of the second touch sensor module,
   wherein the fingerprint sensor of the second touch sensor module has a first set of sensing electrodes, the touch sensor of the second touch sensor has a second set of sensing electrodes, and the second set of sensing electrodes has one or more pitches including a minimum pitch,
   wherein the first set of sensing electrodes is aligned generally orthogonally to a first direction of motion of a finger, the first set of sensing electrodes form a predetermined pattern having a width along the first direction and a length along a second direction orthogonal to the first direction, and
wherein the second set of sensing electrodes comprises one or more copper pads arranged around the fingerprint sensor, the minimum pitch of the one or more copper pads is substantially larger than the width of the predetermined pattern formed by the first set of sensing electrodes.

2. The hand-held electronic device as claimed in claim 1, further comprising:
a first surface having the display element coupled thereto;
a second surface having the sensing surface coupled thereto, the second surface is not coplanar with the first surface;
the controller is further configured to:
display on the display element a first information responsive to a positive match between the detected fingerprints and the fingerprint signature; and
display on the display element a second information responsive to the at least one character of the contact.

3. The hand-held electronic device as claimed in claim 2, wherein the first information is different from the second information, and the at least one character of the contact further comprises a movement or double-click of the contact.

4. The hand-held electronic device as claimed in claim 2, further comprising:
a third surface having a button coupled thereto, wherein the first surface, the second surface, and the third surface are not coplanar with each other, and
wherein the physical storage is further configured to store a database in which at least one predetermined command is associated with the at least one character of the contact, and
the controller is further configured to:
turn off the display element;
after turning off the display element, display on the display element a locked screen when the button is pressed;
after displaying on the display element the locked screen, display on the display element an unlocked screen responsive to the at least one predetermined command or the positive match between the detected fingerprints and the fingerprint signature.

5. The hand-held electronic device as claimed in claim 4, wherein the second surface is connected to the third surface, and the distance between the sensing surface and the button does not exceed twelve centimeter.

6. The hand-held electronic device as claimed in claim 1, wherein the fingerprint sensor and the touch sensor are coplanar on the sensing surface.

7. The hand-held electronic device as claimed in claim 6, wherein:
the first set of sensing electrodes having one or more pitches including a maximum pitch; and
wherein the minimum pitch of the second set of sensing electrode is substantially larger than the maximum pitch of the first set of sensing electrodes, the second set of sensing electrodes are distributed around the first set of sensing electrodes, and the first set of sensing electrodes and the second set of sensing electrodes are coplanar on the sensing surface.

8. The hand-held electronic device as claimed in claim 1, wherein the sensing surface further comprises:
a substrate having the first set of sensing electrodes and the second set of sensing electrodes coupled thereto;
a circuitry configured on the substrate and connecting the first set of sensing electrodes and the second set of sensing electrodes with the controller;
a protective cap mounted on the substrate and covering the first set of sensing electrodes and the second set of sensing electrodes.

9. The hand-held electronic device as claimed in claim 1, wherein the second set of sensing electrodes comprises at least a transmitter electrode, a receiver electrode and a gap pattern between the transmitter electrode and the receiver electrode.

10. The hand-held electronic device as claimed in claim 1, wherein the fingerprint sensor is a swipe type fingerprint sensor.

11. The hand-held electronic device as claimed in claim 1, wherein: the fingerprint sensor having a first sensing area while the touch sensor having a second sensing area, the second sensing area is substantially larger than the first sensing area, and the second sensing area is at least partially overlap with the first sensing area.

12. The hand-held electronic device as claimed in claim 6, wherein:
the fingerprint sensor is configured to detect the fingerprints at a first scan rate while the touch sensor is configured to detect the contact at a second scan rate, and the first scan rate is substantially faster than the second scan rate.

13. The hand-held electronic device as claimed in claim 6, wherein:
the fingerprint sensor is configured to detect the fingerprints at a first pixel density while the touch sensor is configured to detect the contact at a second pixel density, and the first pixel density is substantially larger than the second pixel density.

14. A method for controlling a hand-held electronic device, comprising:
detecting fingerprints and a contact of an object on a sensing surface of the hand-held electronic device, wherein the sensing surface comprises a second touch sensor module comprising a fingerprint sensor for detecting the fingerprints and a touch sensor for detecting at least one character of the contact, and wherein a display element of the hand-held electronic device comprises a first touch sensor module disposed on a display panel for detecting touch events on the touch sensor module;
determining whether a composition of detected fingerprints matches with a fingerprint signature;
determining at least one character of the contact, wherein the at least one character comprises a location on which the object contacts the sensing surface;
controlling the hand-held electronic device based on whether the composition of detected fingerprints matches with the fingerprint signature and the at least one character of the contact; and
switching the sensing surface between a fingerprint recognition mode to detect fingerprints through the fingerprint sensor and a touch sensing mode to detect the at least one character of the contact through the touch sensor of the second touch sensor module,
wherein the first touch sensor module and the second touch sensor module are respectively disposed on opposite surfaces of the hand-held electronic device, and are spatially separated from each other and function independently,
wherein the sensing surface comprises a first set of sensing electrodes having one or more pitches including a maximum pitch and a second set of sensing electrodes having one or more pitches including a minimum pitch and distributing around the first set of sensing electrodes,
wherein the first set of sensing electrodes is aligned generally orthogonally to a first direction of motion of a finger, the first set of sensing electrodes form a predetermined pattern having a width along the first direction and a length along a second direction orthogonal to the first direction, and
wherein the second set of sensing electrodes comprises one or more copper pads arranged around the fingerprint sensor, the minimum pitch of the one or more copper pads is substantially larger than the width of the predetermined pattern formed by the first set of sensing electrodes.

15. The method as claimed in claim 14, further comprising:
displaying on the display element of the hand-held electronic device a first information responsive to a positive match between the detected fingerprints and the fingerprint signature; and
display on the display element a second information responsive to the at least one character of the contact.

16. The method as claimed in claim 15, wherein the first information is different from the second information, and the at least one character of the contact further comprises a movement or double-click of the contact.

17. The method as claimed in claim 15, further comprising:
turning off the display element;
after turning off the display element, turning on the display element and displaying on the display element a locked screen when a button of the hand-held electronic device is pressed;
after displaying on the display element the locked screen, displaying on the display element an unlocked screen responsive to at least one predetermined command associated with the at least one character of the contact or the positive match between the detected fingerprints and the fingerprint signature.

18. The method as claimed in claim 17, wherein the distance between the sensing surface and the button does not exceed twelve centimeter.

19. The method as claimed in claim 14, wherein the minimum pitch of the second set of sensing electrode is substantially larger than the maximum pitch of the first set of electrodes, the step further comprises:
detecting the fingerprints through the first set of sensing electrodes; and
detecting the contact of the object through the second set of sensing electrodes.

20. The method as claimed in claim 14, wherein the second set of sensing electrodes comprises at least a transmitter electrode, a receiver electrode and a gap pattern between the transmitter electrode and the receiver electrode, the step further comprises:
transmitting a scanning signal through the transmitter electrode;
detecting a variation of mutual capacitance through the receiver electrode in response the scanning signal transmitted on the transmitter electrode; and
detecting the contact of the object based on the variation of mutual capacitance.

21. The method as claimed in claim 14, further comprising:
detecting the fingerprints at a first scan rate;
detecting the contact of the object at a second scan rate, wherein the first scan rate is substantially faster than the second scan rate.

22. The method as claimed in claim 14, further comprising:
detecting the fingerprints at a first pixel density;
detecting the contact of the object at a second pixel density, wherein the first pixel density is substantially larger than the second pixel density.

* * * * *